US005741979A

United States Patent [19]
Arndt et al.

[11] Patent Number: 5,741,979
[45] Date of Patent: Apr. 21, 1998

[54] PARTICLE VELOCITY MEASURING SYSTEM

[75] Inventors: G. Dickey Arndt, Friendswood; James R. Carl, Houston, both of Tex.

[73] Assignee: The United States of America as represented by the Administrator of National Aeronautics and Space Administrator, Washington, D.C.

[21] Appl. No.: 556,241

[22] Filed: Nov. 9, 1995

[51] Int. Cl.⁶ .................................................. G01F 1/708
[52] U.S. Cl. .............................. 73/861.05; 324/639
[58] Field of Search .................. 73/861.05, 861.06, 73/861.95, 861.07, 861.08; 324/639, 640, 641, 642

[56] References Cited

U.S. PATENT DOCUMENTS

| | | | |
|---|---|---|---|
| 2,631,242 | 6/1953 | Metcalf | 250/43.5 |
| 3,366,952 | 1/1968 | Mori | 343/6.5 |
| 3,621,710 | 11/1971 | Day | 73/194 |
| 3,807,231 | 4/1974 | Spaw | 73/290 R |
| 3,935,970 | 2/1976 | Spaw | 222/56 |
| 4,169,543 | 10/1979 | Hall | 222/56 |
| 4,222,267 | 9/1980 | Aldrich | 73/304 C |
| 4,226,118 | 10/1980 | Aldrich | 73/290 V |
| 4,402,230 | 9/1983 | Raptis | 73/861.04 |
| 4,423,623 | 1/1984 | Ho et al. | 324/639 |
| 4,459,858 | 7/1984 | Marsh | 73/861.12 |
| 4,483,199 | 11/1984 | Beiermann et al. | 73/861.04 |
| 4,503,383 | 3/1985 | Agar et al. | 324/61 P |
| 4,554,828 | 11/1985 | Doll | 73/202 |
| 4,589,281 | 5/1986 | Aldrich | 73/290 R |
| 4,629,987 | 12/1986 | KIng et al. | 324/306 |
| 4,659,218 | 4/1987 | de Lasa et al. | 356/133 |
| 4,912,982 | 4/1990 | Yuki | 73/861.05 |
| 4,938,079 | 7/1990 | Goldberg | 73/861.95 |
| 4,947,128 | 8/1990 | Hatton et al. | 324/640 |
| 4,947,129 | 8/1990 | Helms et al. | 324/640 |
| 4,977,915 | 12/1990 | Marrelli | 137/4 |
| 5,022,274 | 6/1991 | Klinzing, et al. | 73/861.04 |
| 5,048,335 | 9/1991 | Marsh et al. | 73/304 C |
| 5,099,697 | 3/1992 | Agar | 73/861.04 |
| 5,101,163 | 3/1992 | Agar | 324/639 |
| 5,101,367 | 3/1992 | Agar | 364/551.01 |
| 5,121,639 | 6/1992 | McShane | 73/861.06 |
| 5,140,270 | 8/1992 | Martin et al. | |
| 5,177,444 | 1/1993 | Cutmore | 324/639 |
| 5,261,282 | 11/1993 | Grabowski et al. | 73/861.05 |
| 5,263,363 | 11/1993 | Agar | 73/61.44 |
| 5,502,393 | 3/1996 | Yamaguchi | 324/639 |
| 5,581,191 | 12/1996 | Yamaguchi | 324/639 |
| 5,610,527 | 3/1997 | Yamaguchi | 324/639 |

OTHER PUBLICATIONS

Article titled "Electro-magnetic Probe Techniques For Fluid Flow Measurements" by G.D. Arndt and J.R. Carl.

Primary Examiner—Ronald L. Biegel
Attorney, Agent, or Firm—Hardie R. Barr

[57] ABSTRACT

Method and apparatus are provided for determining the velocity of individual food particles within a liquid/solid food mixture that is cooked by an aseptic cooking method whereby the food mixture is heated as it flows through a flowline. At least one upstream and at least one downstream microwave transducer are provided to determine the minimum possible travel time of the fastest food particle through the flowline. In one embodiment, the upstream detector is not required. In another embodiment, a plurality of small dipole antenna markers are secured to a plurality of food particles to provide a plurality of signals as the markers pass the upstream and downstream transducers. The dipole antenna markers may also include a non-linear element to reradiate a harmonic frequency of a transmitter frequency. Upstream and downstream transducers include dipole antennas that are matched to the impedance of the food slurry and a signal transmission cable by various impedance matching means including unbalanced feed to the antennas.

31 Claims, 4 Drawing Sheets

PARTICLE VELOCITY MEASURING SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

BACKGROUND OF THE INVENTION

1. Field of the Invention

The present invention relates to methods and apparatus employing electromagnetic probes and sensors operable for monitoring flowline velocities, and more particularly, apparatus and methods are provided for monitoring flow velocities of individual components of a solid/liquid mixture in a flowline wherein the individual components may typically have different velocities with respect to each other.

2. Description of Prior Art

The food processing industry, represented by the National Food Processors Association (NFPA) with over 500 member companies has long sought a method to measure the time of travel of individual food particles within a food mixture, such as a beef stew or other food product, as the food particles or elements flow through a heated flowline in an aseptic cooking process. The aseptic cooking method provides better control over cooking and better taste to the end product than the retort method of cooking that is presently used for cooking such products. However, for purposes of reliably obtaining the desired taste as well as for purposes of sterilizing and/or pasteurizing the food mixture, it is necessary to know at least the minimum cooking time of each individual component of the mixture as it flows through the heated flowline.

It will be noted that while the features of the present invention are especially adapted herein to be suitable for measuring transit times of individual food elements within a blend of food components, more generally the features of the present invention are also applicable to usage such as but not limited to: (1) determining liquid changes in a mixing tank or pipeline, (2) determining volume fractions of substantially immiscible fluids such as that of oil and water in a flowline, (3) detecting impurities in water, and (4) distinguishing flow regimes such as turbulent flow, laminar flow, slug flow, bubble flow, plug flow, and the like.

Currently, products such as juice in juice boxes, milk, and ice cream can be processed using the aseptic method of cooking wherein the product typically flows through a flowline rather than being cooked within a retort. In the past, the aseptic method of cooking foods has not been used for food products such as stews, pastas, soups, and other multiple component slurries of food. Even though the end product taste is better, it has been too difficult to determine the cooking time of all food particles because different food particles may typically travel at different rates of speed through the flowline. The temperature inside the food particle and the time the food particle takes to flow through a holding tube determines whether the particle is adequately cooked and sterilized.

In the aseptic cooking method, the packaging for the food product and the food product are separately sterilized. The container is filled with food product in a sterile environment and is then sealed. Typically, the aseptic method of cooking requires pumping the food product through a flowline that includes a heat exchanger to heat the product, a hold tube to sterilize the product, and another heat exchanger to cool the product. The hold tube is typically constructed of 316 stainless steel that may typically be about 0.065 inches thick.

A procedure for measuring the cooking time of individual food particles should not alter the food product flow wherein particles may typically range from about 0.25 to 1 inch in size. The procedure should also be operational with relatively salty slurries that are heated so as to be substantially conductive and may have a conductance in the range of about one to ten mho meters. The temperature inside the pipe may typically range from about 270° to 285° with pressures of approximately 60 psig. The method should not use hazardous or toxic materials for markers. Any markers utilized should have a density about the same as the food particles and should be sized so that they can be disposed within small as well as large food particles.

Various methods have been attempted in the past to measure the velocity of individual food components within a food slurry. Markers such as magnets have been embedded into tracer particles to produce an emf as the tracer particles pass by detector coils. However, the smallest magnets that can be reliably detected in the process are about 0.5 inches and typically have a substantially different density than the food particles of interest. Visual methods have also been attempted but without significant success.

U.S. Pat. No. 5,261,282 to Grabowski et al. discloses a method and apparatus for monitoring a continuous cooking process based on particulate residence time. The process utilizes simulated food particles, each including a transponder having a predetermined identifying signal, to be subjected to the process along with the actual food particles. The method and apparatus relates to a continuous pasta cooking process in which a transponder in a simulated product emits an identifying signal received at various stations along the process to indicate the time of passage between the stations. The apparatus is limited to measurement of particle sizes of about an inch long due to the length of the transponders. As well, the system may have difficulty with reliable signal transmission especially when used with high loss food slurries.

U.S. Pat. No. 5,022,274 to Klinzing et al. discloses a high temperature particle velocity meter comprised of a pair of spaced apart conducting portions having disposed on each of their upstream edges a first and second non-conducting portion. The bombardment of the particles on the conducting and non-conducting portions creates charged particles in the pneumatically transported material.

U.S. Pat. No. 2,631,242 to G. F. Metcalf discloses a method and apparatus for marking fluids in pipe lines with a radioactive isotope whereby the boundary between two fluid bodies flowing in sequence through a pipe line can be located, its movement followed, and the condition of the boundary line determined.

U.S. Pat. No. 4,483,199 to Beiermann et al. discloses a method of measuring a solid matter mass flow during conveying of solid matter-gas suspensions in tubular conduits, particularly during conveying in a dense stream with high pressure. The process includes using radioactive tags that pass by two radiation detectors.

U.S. Pat. No. 4,629,987 to King et al. discloses a method and apparatus for measuring flow velocity of a compound within a pipe whereby a static magnetic field is imposed on the flowing material of interest using an upstream coil. A downstream detection coil provides a timing signal as the tagged element flows thereby.

U.S. Pat. No. 3,366,952 to Hideo Mori provides for automatic identification of objects including railroad cars and locomotives and comprises a coded microwave reflector disposed upon each car and a microwave transmitter and receiver antennae for sending and detecting the desired signals.

U.S. Pat. No. 3,621,710 relates to a velocity measuring system consisting of a pipe with multiple sensors connected through an instrumentation panel. Different radioactive tracers having different energy levels and being compatible with only one component in the multi-component stream to be measured are used to identify the various components in the flowline by means of radioactive detectors provided at various locations through the flowline.

U.S. Pat. No. 5,101,163 to J. Agar discloses a device for measuring the concentration of two substances through the transmission of electromagnetic waves. The device utilizes at least one transmission element for transmitting a signal and at least two receiving elements for receiving signals from the at least one transmission element for measurement purposes.

U.S. Pat. No. 5,099,697 to J. Agar discloses a device for measuring multi-phase fluid flow having a flow restrictor, first and second flow meters, and first and second pressure measurement means. No disclosure of electromagnetic wave measurements is made.

U.S. Pat. No. 5,101,367 and U.S. Pat. No. 5,263,363 to J. Agar discloses a method and apparatus for measuring the percentages of oil and water present in an oil/water mixture that requires measurement of energy absorption properties as well as flow data from a flow meter to determine which of various data curves to select so as to obtain an appropriate oil/water mixture reading. The preferred flow meter is a positive displacement flow meter and therefore necessarily mechanical in operation.

U.S. Pat. No. 4,503,383 to Agar et al. discloses a device for detecting an interface between two fluids of differing electrical properties using a probe that requires an air core therein.

A paper entitled "Electromagnetic Probe Technique For Fluid Flow Measurements" by J. R. Carl and G. D. Arndt, who are listed as inventors of the present invention, describes an exemplary system that utilizes microwave techniques for measurements made on fluids.

A microwave watercut monitor is disclosed in related patents including U.S. Pat. No. 4,947,128 to Hatton et al., U.S. Pat. No. 4,947,129 to Helms et al., and U.S. Pat. No. 4,977,915 to Marrelli. The co-variance microwave watercut monitor requires a test cell suitably constructed to include antenna wave guides and a flow path adapted to receive the flowway of a petroleum stream. A detector assembly connected to the circulator detects the intensity of the test microwave energy. The watercut is indicated in accordance with the intensity signal and the phase difference between the source provided microwave energy and the test microwave energy.

A monitoring system and method for detecting the presence or absence of a material at a location by utilizing an antenna and a control unit is disclosed in related patents including U.S. Pat. No. 4,589,281, U.S. Pat. No. 4,226,118, U.S. Pat. No. 4,169,543; and U.S. Pat. No. 4,222,267 to J. L. Adrich. The antenna provides a signal if material affecting the impedance of the antenna is in the sensing area.

U.S. Pat. No. 3,807,231 and U.S. Pat. No. 3,935,970 to R. L. Spaw disclose automatic level control systems using a single length of insulated, stranded steel cable as a radiating antenna whose reactance varies as a function of the level of material in the container adjacent the antenna.

Several patents are concerned with determining fluid flow rates. U.S. Pat. No. 4,402,230 to A. C. Raptis is directed to measurement of flow velocities of individual phases of multi-phase flow, using two probes located at different positions separated along the flow. Matched filter techniques are employed to identify the spectral signals of the individual phases, and the output signals are cross-correlated to determine the transit delay for each phase between the probes, which may be either optical, thermal or acoustical types.

U.S. Pat. No. 4,459,858 to L. B. Marsh discloses an intrusive probe for use in measuring the velocity of a flowing fluid. The probe includes an electromagnet for generating an electromagnetic field in the moving fluid, and a plurality of electrodes for producing electrical signals in response to the flow of fluid through the electromagnetic field.

U.S. Pat. No. 4,554,828 to F. Doll discloses another intrusive probe including a coil for generating a magnetic field through which flows the fluid whose flow rate is to be measured. Electrodes provide a mechanism for obtaining a voltage that is proportional to the fluid flow rate. The probe is immersed in the moving fluid, and flowing fluid passes through a channel through the probe.

U.S. Pat. No. 4,659,218 to de Lasa et al. discloses fiber optic probes for sensing light intensity in monitoring characteristics of bubbles in two and three phase systems.

A level detector is disclosed in U.S. Pat. No. 5,048,335 to Marsh et al. A resonant circuit includes a capacitance probe disposed in a vessel so as to be responsive to variations in capacitance as a function of the level of material in the vessel. An oscillator is coupled to the resonant circuit and to a phase detector for detecting variations in phase angle as a function of the capacitance of the probe. The output of the phase detector is used to obtain an indication of the level of material.

U.S. Pat. No. 5,140,270 to Martin et al. discloses an apparatus for determining the quality of the dielectric material in a transformer bushing. The device uses the bushing as a capacitive element to determine the interior condition of the bushing.

Consequently, there remains a need for a reliable, relatively inexpensive, less complex apparatus and method for measuring the velocity of food particles in a food slurry or multi-phase flow through a flowline. Those skilled in the art have long sought and will appreciate that the present invention provides solutions to these and other problems.

SUMMARY OF THE INVENTION

The present invention provides an apparatus operable for measuring transit times of food elements within a food slurry traveling through a flowline. The flowline is generally tubular and typically comprised of stainless steel. The apparatus comprises an upstream microwave transducer with an upstream transmitter and upstream receiver spaced across the flowline with respect to each other for transmitting a microwave signal through the flowline. A downstream microwave transducer is provided that has a downstream transmitter and downstream receiver spaced across from each other for transmitting a microwave signal through the slurry in the flowline. At least one microwave energy source is used to supply at least one transmitter signal to the upstream and the downstream transmitters. At least one detector is used for detecting an upstream and a downstream signal from respective of the upstream and the downstream receivers. At least one sampler circuit is operable for obtaining digital samples of the upstream and downstream samples at a sampling rate of 250 samples per second or greater. At least one marker is mounted in at least one of the food elements within the food slurry. The marker is operable for altering the food slurry impedance so that a signal loss can be detected at the upstream and downstream receivers. A storage member is provided for storing the digital samples.

The apparatus is operable for measuring transit times of elements within a slurry traveling through the flowline wherein the slurry has a signal loss at the desired transmission frequency of greater than approximately 15 decibels per 50 millimeters. For this purpose, impedance matching members and techniques or structures are provided for matching the transmitter and receiver co-axial cables to the food slurry.

In operation, the method provides for the steps of directing the flowstream between an upstream transmitter and an upstream receiver and also directing the flowstream between a downstream transmitter and a downstream receiver. An upstream microwave signal is transmitted from the upstream transmitter to the upstream receiver through the flowstream at a first frequency. A downstream microwave signal is transmitted from the downstream transmitter to the downstream receiver through the flow stream at a second frequency which may be the same as or substantially the same as the first frequency. The upstream microwave signal is altered using at least one marker element in the flowstream when the at least one marker element intersects the upstream microwave signal to thereby produce an upstream signal to be received by the upstream receiver. The downstream microwave signal is similarly altered as the at least one marker element in the flowstream intersects the downstream microwave signal to thereby produce an downstream signal to be received by the downstream receiver. The upstream signal may be received at a harmonic frequency with respect to the first frequency. The downstream signal may also be at a harmonic frequency with respect to the second frequency.

An upstream dipole transmitter antenna may be provided within the flowline at an upstream position in the flowstream. The upstream transmitter antenna impedance is matched to the flowstream impedance by techniques such as unbalanced feeding of the first dipole antenna. A downstream dipole transmitter antenna may be provided within the flowline at a downstream position in the flowstream and is also impedance matched to the flowstream impedance by techniques such as unbalanced feeding of the downstream dipole transmitter antenna. Whereas the downstream detector is always a requirement, the upstream detector may in some cases be eliminated.

It would be advantageous and desirable to provide a reliable and accurate technique for detecting the presence of components within two-phase slurries and then measuring the velocity of such components through the flowline, and it is an object of the present invention to do so.

It is a further object of the present invention to provide a technique that is capable of detecting the amplitude and/or phase difference produced by an element of a multi-phase flow such as a solid element in a substantially liquid slurry.

It is also an object of the present invention to provide a system that is operable for reliably transmitting radio signals through hot, salty, and otherwise conductive slurries.

It is another object to provide relatively low cost transducers and marking elements for use in measuring velocities of food particles through a flowline.

These and other objects, features, and advantages of the present invention will become apparent from the drawings, the descriptions given herein, and the appended claims.

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DESCRIPTION OF PREFERRED EMBODIMENTS

The present invention is operable to detect the presence of an element, such as a relatively small marker antenna or reflector, within a slurry that contains both solids and fluids by sensing a change in the properties of the mixture. The transit time of movement of the element between two positions along a flowline is measured. The element may be detected as a result of transitory phase and/or amplitude changes in a microwave transmission path caused by the passage of the elements of interest. The load impedance seen by the sensor at the location is determined by the complex permittivity of the material present at the location. Although the present invention is adapted for detecting both solids and liquids within a mixture, so long as multiple fluids in a flowline could be identified by their complex permittivities, the present invention can also be used to distinguish such fluids. As used herein, the word "fluid" refers to liquids, vapors and gases.

Figure 1:
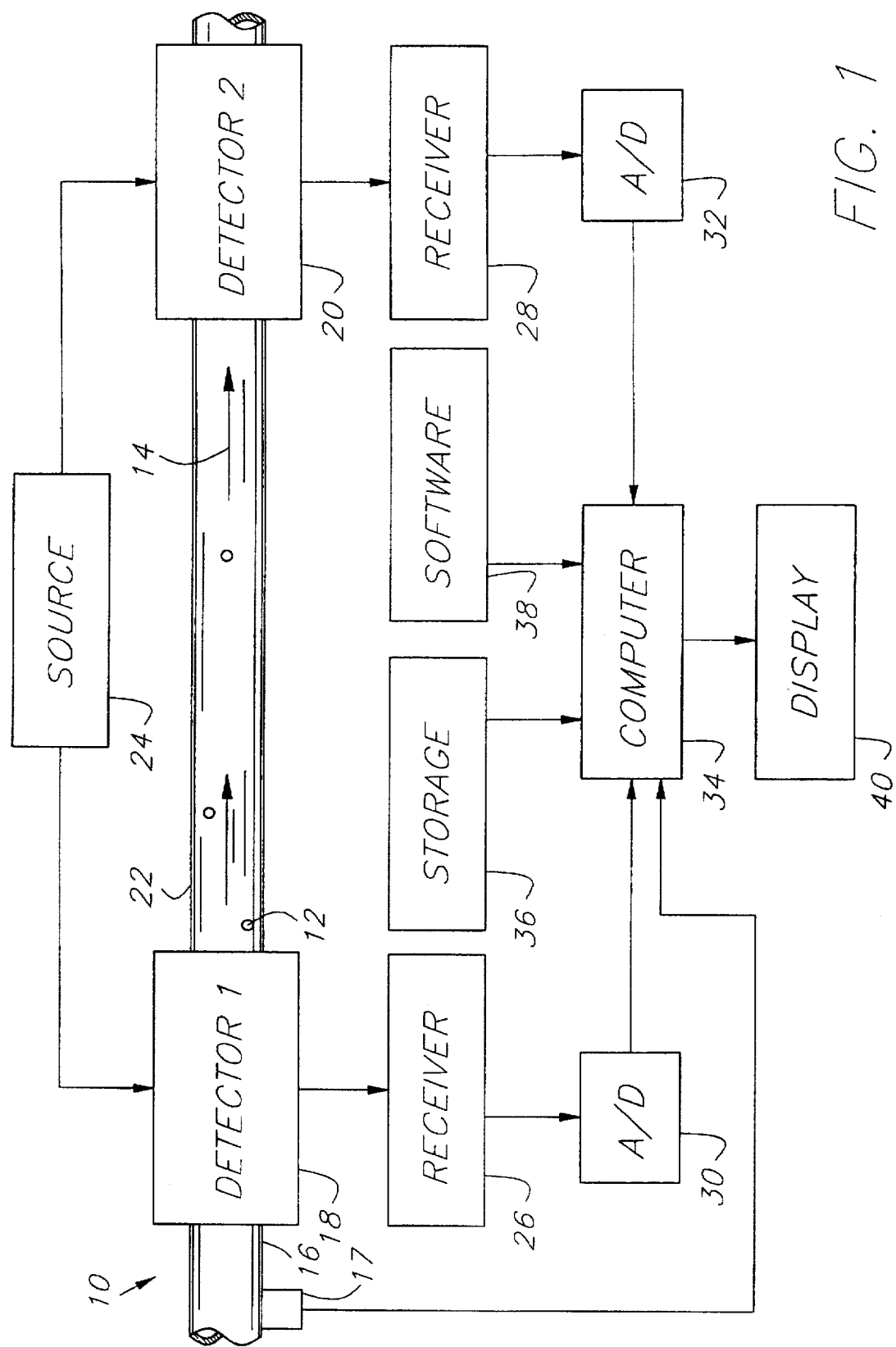
FIG. 1 is a schematic representation of a food particle velocity monitor in accord with the present invention.

FIG. 1 schematically discloses velocity monitor 10 for measuring the transit time or velocity of elements 12 in a slurry 14 traveling through a flowline 16 between upstream transducer 18 and downstream transducer 20. Elements 12 may include food particles and may also include food particles that include markers such as dipole antennas as discussed hereinafter. An injector 17 may be provided for injecting food particles and/or markers into flowline 16. Various configurations for an injector may be provided such as plunger (not shown) and valve or the like. A timing signal may be provided to computer 34 to indicate the time at which markers were injected into flowline 16.

In the present embodiment of the invention, slurry 14 will typically be comprised of solids and fluids such as beef broth, beef, vegetables, and the like and is heated for cooking such foods. Typically the dielectric constant of such slurry 14 will range from about 50 to 60 for the frequencies of interest. The conductivity of slurry 14 will normally be in the range of about 1–10 mhos per meter. The loss of a useful radio signal through the slurry will typically be greater than approximately 15 decibels per 50 millimeters and the loss may range up to or above 65 decibels per 50 millimeters.

Flowline 16 will normally be contained within stainless steel pipe 22 that may typically be about two inches in diameter but could also be of different sizes such as one or one and one-half inch diameter pipe. Typical cutoff frequencies for two inch pipe with a food medium present may be in the range of about 1.0 gigahertz when loaded with a food slurry.

Transmission loss through the food medium will typically increase rapidly with frequency. Therefore, the frequency of operation should be low enough such that the transmission loss will preferably not exceed 100 decibels for a transmission path of about 2 inches including the coupling of antennas, load, and transmission lines. Greater transmission losses would likely make it difficult to avoid leakage paths from the transmitter to the receivers that would cover up the desired frequency. Typical frequencies of operation of the present invention may range from about 0.6 to about 1 gigahertz. Transmission loss will normally increase with temperature. These relationships need to be established for the various types of food media of interest when providing a design of the present invention to a particular application.

Microwave source 24 may be used to provide a signal for upstream and downstream transducers 18 and 20. It will be understood that more than one microwave source 24 may be used so that upstream and downstream transducers 18 and 20 could be operated at different frequencies or spaced far apart if that were desired although a single source 24 will be less expensive and is the presently preferred embodiment of the invention. Microwave source 24 may be nothing more than a crystal controlled oscillator and therefore be relatively inexpensive. Additional transducers 18 and 20 may also be used as desired. As will be discussed subsequently, the transducers and antennae therein may also be provided at a relatively low cost.

Upstream and downstream receivers 26 and 28, respectively, may be used to receive or detect the signals from the transducers. In one presently preferred embodiment, receivers 26 and 28 are single frequency units and are not expensive. Upstream and downstream analog-to-digital converter boards 30 and 32 are also relatively inexpensive and provide the analog signals in digital format for use by computer 34. A sample rate of about 0.01 milliseconds to 0.1 milliseconds should be sufficient to prove an accurate time tag for each element to be detected. However, sample rates of more than 10 MHz could be used to monitor rapid changes. While lower sample rates could be used, it is desirable for typical conditions to provide at least 100 samples per second for a desired resolution of the received signal waveform.

Computer 34 is provided with sufficient memory 36 to store data for a measurement run obtained from an extensive number of measurements and software 38 is used to statistically analyze the results to give results within a desired range and to provide for uniform, consistent testing and calibration. A display unit 40 is provided to output the results of the data analysis. Display unit 40 may be a printer or video monitor, for example. The system 10 may obtain and process data at high sampling rates to effectively monitor conditions in the flowline 16 instantaneously and continuously.

While the system of the present embodiment is specifically used to determine transit times of food particles within a slurry by detection of specific signals, the computer may be programmed to determine complex permittivity information for each sample in response to phase and amplitude difference information in a manner known to those skilled in the art. This information can be compared to known values and used to provide other useful information. For instance, this technique would lend itself to determining the progress of a mixing system. By way of example only, the salinity of a salt water solution and the instantaneous changes in the solution can be determined as may be desirable. A single transducer may be used to identify laminar flow or turbulent flow.

Even more generally, a single, non-intrusive probe may be appropriately placed on a pipe, tank or other type of vessel containing one or more fluids to monitor the fluid or fluids at the location of the probe, to detect changes in the fluid or fluids at the location of the probe as a function of time, and to detect the presence or absence of fluid at the level of the probe to identify a full or empty vessel, or whether the vessel contains liquid up to the level of the probe. As well, impurities in a product may be identified substantially instantaneously by monitoring the product using a system according to the present invention.

Figure 2:
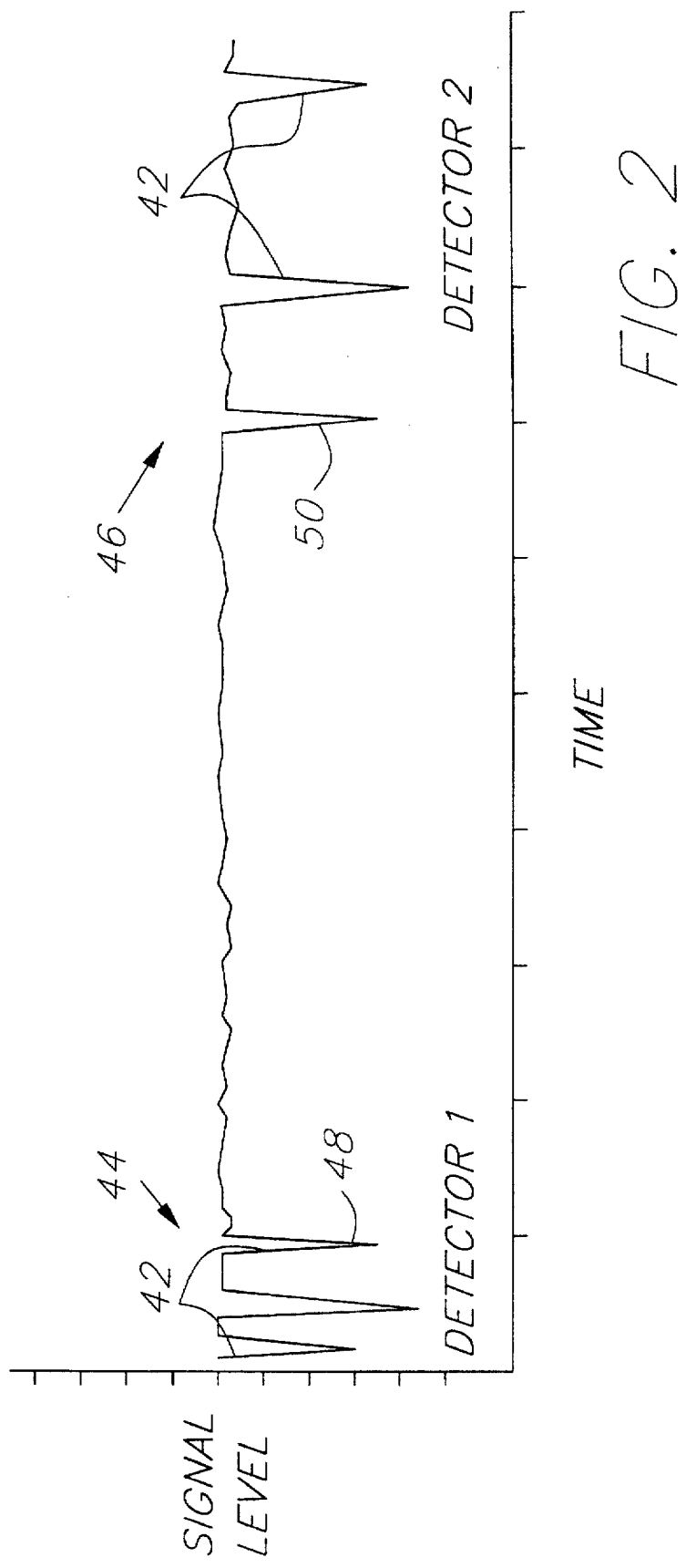
FIG. 2 is a graph with respect to time of signal response from upstream and downstream transducers in a flowline with respect to a plurality of marker elements disposed in a food slurry in accord with the present invention.

FIG. 2 discloses an amplitude versus time response of the system during operation. Each signal 42 is a result of a transitory amplitude change in the microwave transmission path caused by a particle of interest. In a presently preferred embodiment, the particles of interest are enhanced in some way such that they will provide transitory changes that are distinctive enough that they will not be mistaken for normal variations in the received signal caused by the non-homogeneous nature of the medium flowing in flowline 16. The range of normal variations in the signals caused by the medium needs to be established so that it can be determined how the particles of interest should best be marked in order to provide a distinguishable change in amplitude, phase, and/or frequency.

In operation, upstream and downstream transducers 18 and 20 are turned on. A known quantity of marked particles are released into flowline 16 just upstream of the upstream transducer 18. As the particles pass by the transducers, they are recorded with a resolution related to the sampling rate. As shown in FIG. 2, the particles produce an upstream group 44 of signals 42. The particles eventually pass downstream transducer 20 to produce downstream group 46 of signals 42. Typically, signals 42 from downstream group 46 are more time separated than those of upstream group 44 due to the difference in velocity of the individual particles through flowline 16. The time between the last signal 48 of upstream group 44 and the first signal 50 in downstream group 46 is designated as the minimum transit time. The time delay can be used to calculate the food particle velocity because the spacing between the upstream and downstream transducers is known. Thus, the maximum possible velocity can be determined by dividing the detector separation by the minimum transit time. Statistics such as average velocity, mean velocity, and standard deviation may be determined for the run. Enough runs are made to provide statistics that indicate a desired confidence level of operation. In another embodiment only a downstream transducer 20 is used and time is measured from the time of injection. This embodiment is not preferred but is less expensive and may be desirable for some applications.

Figure 3:
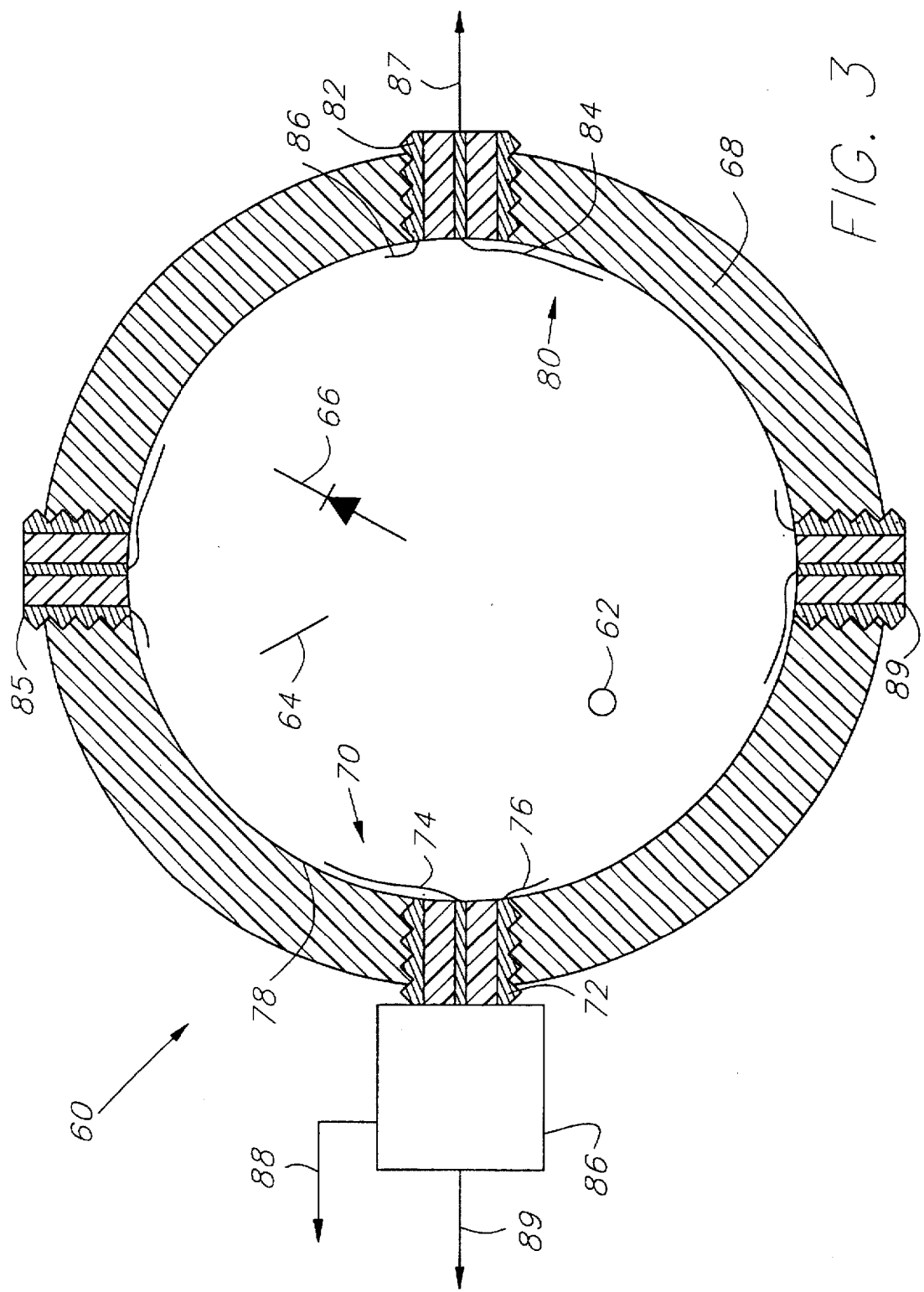
FIG. 3 is an elevational view, in cross-section, of a transducer having therein an unbalanced fed dipole transmitter and receiver antenna in accord with the present invention.

FIG. 3 discloses a cross-section of a presently preferred embodiment of a dipole type transducer 60. Various types of marking elements 62, 64, and 66 are shown in the slurry within transducer 60. Typically, only one type of marking element will preferably be used although it may be desirable in some cases to use different markers to produce different distinct responses. In some cases depending on the type of food product, the food elements themselves may form an adequate marker without any enhancement at all.

A simple way to mark a particle of food, without substantially affecting its size or weight in the slurry, is by insertion of a pellet 62 or BB of some light metal such as beryllium, magnesium, or aluminum. The light weight pellet 62 does not significantly alter the specific gravity of the food particle but does significantly effect the transmission loss and/or reflection loss.

A stronger signal loss may be provided by a resonant half-wave dipole element 64. A resonant dipole in the food medium of slurry 14 is much smaller than in air and may range from about 2–30 millimeters in length with more typical values being in the range of from about 6 to 20 millimeters. The dipoles are preferably formed of a thin diameter wire.

Another type of marker may be non-linear marker 66 that has a non-linear voltage response. Non-linear marker 66 may be a transistor or diode. For non-linear marker 66, not only the frequency of the transmitter is reradiated, but also a harmonic frequency such as the second harmonic is reradiated. In such a case receivers 26 or 28 would be also tuned, or perhaps only tuned, to the harmonic signal. For instance, the transmitter frequency may be about 940 Mhz and the receiver frequency would then be about 1880 MHz. High frequency microwave diodes suitable for this purpose are typically available for less than one dollar. Transducer 60, which could be either an upstream or downstream transducer comprises a relatively inexpensive section of dielectric pipe 68 that is used to prevent coupling of the signal from the antennas to the metal pipe. After testing, the section of dielectric pipe 68 may be removed and preferably replaced with the same length of stainless steel pipe so that the test results do not need to be adjusted for changes in length of the cooking system. Alternatively, the dielectric pipe 60 may be left in position for regular testing over various time periods, if desired. The cost of materials for the dielectric pipe 60 and the antennas, once designed, is relatively low.

Transmitter antenna 70 is a dipole antenna in one presently preferred embodiment of the invention. Connection to it may comprise a standard relatively low cost SMA bulkhead co-axial connector 72. It will be appreciated that transmitter antenna 70 is fed in an unbalanced manner so as to enhance impedance matching of antenna 70 to a salt food slurry. For instance, with a 2% salt water food slurry, it may be desirable to have a transmitter frequency in the range of about 940 MHz. For this frequency, a longer leg 74 of the dipole antenna may be about 15.65 millimeters and a shorter leg 76 may be about 3.35 millimeters so that the total antenna length is about 19 millimeters. It is also necessary that the thickness or diameter of the center conductor of the dipole antenna be within a desired range of from about 0.3 to 0.8 millimeters for this application. A desired selected value may be about 0.5 millimeters. As well, it is desirable that the antenna be covered with dielectric material such as teflon and that the thickness of the teflon also be selected for impedance matching purposes. In the present application, the teflon coating was chosen to be about 0.5 millimeters from within a range of from about 0.2 to about 0.8 millimeters. Such values must be selected for optimized impedance matching to the desired food slurry medium and, typically, a 50 ohm co-axial signal transmission cable.

Transmitter antenna 70 must be in contact with the food slurry for optimal impedance matching but may be epoxied to the inner wall 78 of dielectric pipe 68. As well, a notch or groove (not shown) may be provided within inner wall 78 such that antenna 70 may be fitted therein so long as it remains in contact with slurry 14. Transmitter antenna 70 is preferably oriented substantially transverse or perpendicular to the axis or general flow direction through dielectric pipe 68 and is therefore preferably curved to match the curvature of inner wall 78. In this manner, the microwave transmission path is maximized. No additional matching element is required to match transmitter antenna 70 with co-axial cable 89. However, signal splitter means 86 may be provide to allow receipt and transmission of a microwave reflection signal 88, if desired for purposes discussed hereinafter. As well, additional transmitters and/or receivers 85, 89 may also be used in conjunction with transmitter antenna 70 to control the transmission path as desired such that each particle is clearly detected. The available space within a pipe, the necessary length of the antennas, and so forth may be considered when determining whether extra transmitters or receivers are necessary.

It will be noted that receiver antenna 80, mounted to co-axial connector 82, is about one-half the length of transmitter antenna 70, in accord with one embodiment of the present invention, whereby a non-linear marker device is used to produce a signal at receiver antenna 80 that is at a harmonic frequency of the transmitter frequency. For instance, if the transmitter frequency is 940 MHz then the receiver antenna 80 may be designed to receive a signal with a frequency of 1,880 MHz and therefore have a different, shorter length to correspond to the different, higher frequency. This feature provides additional distinction to a marker because food particles are very unlikely to have a non-linear voltage response that would produce a harmonic signal. Of course, receiver antenna 80 could also be designed for receiving the same frequency signal where different marking elements are used such as the dipole antennas, magnesium BB's, or other marking elements.

Thus, for the present application an unbalanced fed dipole antenna with a length of 9.5 millimeters is used that has long leg 84 with a length of 8.103 millimeters and a short leg 86 with a length of 1.397 millimeters. Receiver antenna 80 has a diameter of 0.4 millimeters and a teflon coating that is 0.8 millimeters. These values are preferably selected from about the middle of a range of potential values for this particular application as discussed in connection with transmitter antenna 70. It will be understood that for a different application, that the selected values will typically be different so as to match to the application. These values provide impedance matching of the antenna to the food slurry as is desirable to avoid excessive loss and thereby allow the use of less expensive components. Thus, in this manner, dipole receiver 70 is matched to the slurry and also to co-axial cable 87 for maximum signal transfer.

As with transmitter antenna 70, receiver antenna 80 is preferably oriented transverse to the direction of flow, is curved to match inner wall 78, and is preferably oriented in the same manner as transmitter 70. Receiver antenna 80 may be epoxied or secured within a recess but must be in contact with slurry 14 for impedance matching purposes.

The non-complex and inexpensive design of transducer 60 allows for a great many possible modifications and potential uses with different applications. As stated above, additional receiver antennas, indicated at 85 and 89, may be used to increase the effective transmission path for this or other applications. As discussed, it may be desirable for some applications to use reflection signals, either selectively, simultaneously, or with an automatic switching mechanism, rather than have signals received only from receiver antenna 80. Reflection signals do not have the depth of investigation of signals that pass through the slurry, but are relatively easy to receive and do not require an additional receiver antenna. As well, multiple transmitters, that could also be indicated as at 83 and 85, could also be used and multiple reflection signals obtained therefrom. As well, if desired, receiver antenna 80 could conceivably be used as a transmitter antenna for receiving reflection signals. Thus, the simple antenna design of the present invention allows for a wide variety of possible configurations.

Figure 4:
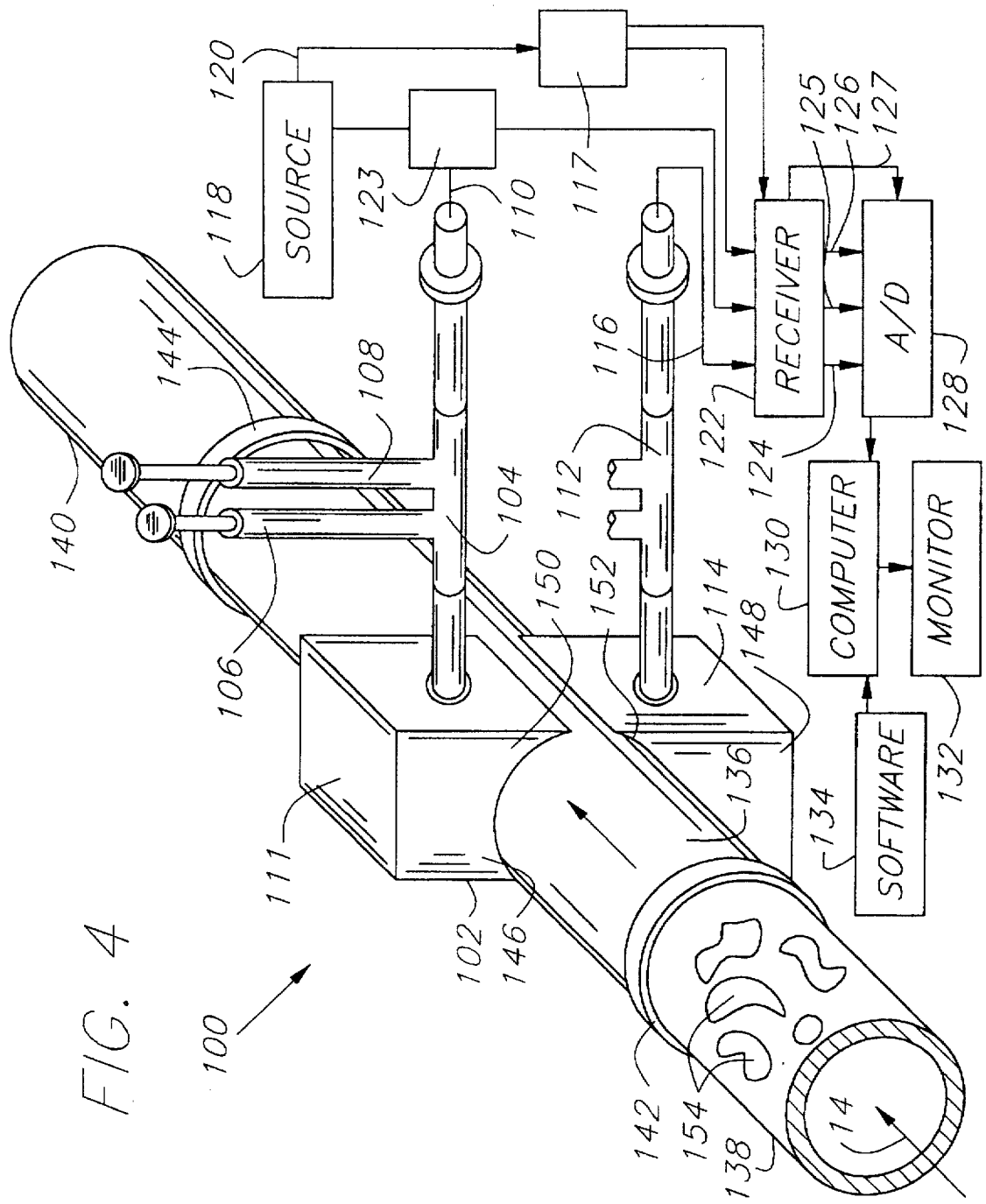
FIG. 4 is a perspective view of a flowline with an alternative embodiment waveguide transducer in accord with the present invention.

Additional features of a food particle velocity meter 100 are disclosed in FIG. 4 wherein upstream transducer 102 is a waveguide type transducer rather than the dipole type transducer 60 shown in FIG. 3. Matching components are preferably used such as double stub tuner 104. Double stub tuner 104 provides a first and second stub tuners 106 and 108 to match waveguide transducer 102 to co-axial cable 110 that will typically be a 50 ohm cable. Double stub tuner 104 is provided for transducer transmitter 111 and double stub tuner 112 is provided for matching transducer receiver 114 to co-axial cable 116. Additional stub tuners are provided for the downstream transducer indicated as 117.

Transmitter source 118 provides a microwave signal through cables 110 and 120. Constant gain receiver 122 has two or more channels to receive signals from upstream transducer 102 and one or more downstream transducers. Reflection signals may also be desirable for some applications as discussed hereinabove and may be obtained from junction 123. The output of constant gain receiver, in this case for four channels 124, 125, 126, and 127 is converted to a digital format by analog-to-digital board 128 as discussed hereinbefore. For this example, upstream receiver and reflection signals 124, 125 are provided along with downstream receiver and reflection signals 126, 127, although, more typically, reflection signals are not required for a food particle velocity meter according to the present invention. Other components such as computer 130, monitor 132, and various software detection algorithms 134 and statistics modules may also be used as discussed herein before.

Fluid particle velocity meter 100 includes a microwave transparent section of pipe 136 that is connected to stainless steel pipe sections 138 and 140 as by flange connections 142 and 144, respectively. Typically, the pipes will be about two inches in diameter but could be of other sizes as discussed hereinbefore. Instead of a microwave transparent section of pipe 136, microwave transparent windows could also be in a steel pipe, if desired. If windows are used rather than a transparent section of pope, then cutoff frequencies may need to be considered. Waveguide transducer 102 includes transmitter 111 and 114 that are impedance loaded to the relative permittivity of the slurry (approximately 60) to provide impedance matching between slurry 14 and the waveguide transducers. Housings 146 and 148 include curved portions 150 and 152, respectively, to match to pipe section 136 or windows. While preferably transmitter 111 and receiver 114 are substantially identical, they could be provided for operation at different frequencies as for use with non-linear marking elements as discussed hereinbefore.

In operation, food elements 154 may be marked with marking elements that do not affect their size or mass and may be used to measure the maximum cooking times as discussed hereinbefore. The food elements may be introduced through valves or other means (not show). As well, a feedback loop for the cooking pipe may be provided during the testing stage until sufficient testing is provided on the system. After testing, the components of the food particle velocity monitor in accord with the present invention may be readily removed and testing begun. It may also be possible, depending on the type of food slurry, that it is not necessary to use marked food particles but rather simply use the actual components of the food mixture itself. This will generally require food particles that have unique characteristics with respect to the food mixture that will be detectable based on phase/amplitude signal changes in the transmission path or from a reflection signal.

Numerous alternative embodiments of the present invention may be provided for many other applications. For instance, where it is desirable, the present system may be calibrated to detect flow regimes such as turbulent flow, laminar flow, bubble flow, mist flow, and the like. Generally only one transducer is necessary for this type of operation if flow velocity is not to be measured. This may be accomplished, for instance, by plotting phase versus amplitude, or phase/amplitude versus time, to distinguish between such different types of flow. In some cases only a reflection signal may be necessary thereby eliminating the need for a receiver element, if desired.

Velocity computations may also be provided by correlation using two detectors assuming the slurry or other fluid components tend to stay substantially the same. Otherwise, the detectors may be placed close to each other so that the slurry does not change too much between detectors. In such a case, the waveform characteristics of the upstream and downstream signals can be matched by cross-correlation of the data streams produced and stored for analysis by computer 34. The time delay can be determined and the macroscopic flow velocity can then be found by dividing the detector spacing by the time delay.

Volume fractions may be determined under some conditions such as when two fluids can be distinguished based on distinctive amplitude/phase plots that they produce. This measurement would preferably be compared to calibration data. For such measurements, that may involve slurries other than food slurries, a switchable flow path for the transmission or reflection signal path may also be used for calibration purposes.

If the volume of the fluid in the transmission path is fixed, then fluid purity can be measured by attenuation or total phase shift, depending on which measurement is more sensitive. This assumes, the impurity is preferably a known fluid. Such a system would probably require calibration data with each fluid.

As well, the general antenna structures of the present invention may be adapted for uses such as for monitoring liquid changes in a mixing tank. Dissolving a liquid into another liquid, or dissolving a solid into a liquid produces changes in the phase/amplitude signals over time that can be monitored by techniques and equipment discussed hereinabove. Sample rates of over 1 MHz could be used to monitor rapid changes.

Therefore, the present invention provides techniques for detecting and monitoring solid/fluid mixtures (as well as other types of mixtures) including monitoring the rate of travel of individual solids within a slurry. While some variations of the present invention have been discussed, those skilled in the art will be able to appreciate that many other possibilities are available after reviewing the teachings of the present invention.

The foregoing disclosure and description of the invention is illustrative and explanatory thereof, and various changes in the method steps as well as the details of the apparatus may be made within the scope of the appended claims without departing from the spirit of the invention.

What is claimed is:

1. An apparatus operable for measuring transit times of food elements within a food slurry traveling through a flowline including a metallic tubular portion, said food slurry having an impedance, said apparatus comprising:

an injector operable for injecting material into said food slurry;

a downstream microwave transducer, said downstream transducer having a downstream transmitter and downstream receiver spaced from each other for transmitting a microwave signal through said food slurry;

at least one microwave energy source to supply a transmitter signal to said downstream transmitter;

at least one marker for injection into said food slurry with said injector, said at least one marker being operable for producing a transitory signal loss of said transmitter signal that is distinguishable with respect to an average signal loss of said transmitter signal through said slurry;

at least one detector for detecting a downstream signal from said downstream receiver;

at least one sampler circuit operable for obtaining digital samples of said downstream signal at a sampling rate of over one thousand samples per second; and a storage member for storing said digital samples.

2. The apparatus of claims 1, further comprising:

an upstream microwave transducer, said upstream microwave transducer having an upstream transmitter and upstream receiver spaced across said flowline with respect to each other for transmitting a microwave signal through said food slurry, said upstream transmitter receiving a transmitter signal from said at least one microwave transducer, said at least one detector being operable to detect an upstream signal, said at least one sampler circuit being operable to obtain digital samples of said upstream signal.

3. The apparatus of claim 1, wherein said marker further comprises:

an element having a non-linear frequency response to said at least one transmitter signal.

4. The apparatus of claim 1, wherein said marker further comprises:

a dipole element.

5. The apparatus of claim 4, wherein said dipole element is less than about 10 millimeters in length.

6. The apparatus of claim 2, wherein said at least one detector is operable for detecting said upstream and said downstream signals at a harmonic frequency of said transmitter frequency.

7. The apparatus of claim 2, further comprising:

an upstream tubular portion adjacent said upstream microwave transducer that is substantially invisible to microwaves, said upstream transmitter and said upstream downstream receiver having respective impedances matched to said impedance of said food slurry; and a downstream tubular portion adjacent said downstream microwave transducer that is substantially invisible to microwaves, said downstream transmitter and said downstream receivers having respective impedances matched to said impedance of said food slurry.

8. The apparatus of claim 7, further comprising:

a double stub tuner for at least one of said upstream and downstream transmitters and receivers, said double stub tuner being operable to match impedances between a coax portion and an antenna portion, said double stub tuner being operable to match impedances between said antenna portion and a respective tubular portion.

9. The apparatus of claim 1, further comprising:

a downstream dielectric tubular portion adjacent said downstream transducer, said downstream transmitter and said downstream receiver being disposed within an internal portion of said downstream dielectric tubular portion.

10. The apparatus of claim 9, wherein said downstream transmitter and said downstream receiver each comprise an unbalanced dipole antenna.

11. An apparatus operable for measuring transit times of elements within a slurry traveling through a flowline, said slurry having a transmitter signal loss of greater than about 15 decibels per 50 millimeters, said apparatus comprising:

at least one marker for injection into the slurry, wherein said marker is operable for altering a microwave signal;

a first dipole antenna in contact with said slurry for transmitting a first microwave signal into said slurry, said first dipole antenna having two legs with one leg being shorter than the other as an unbalanced feed;

at least one microwave energy source to supply said transmitter signal to said first antenna;

at least one detector for detecting a first signal responsive to a first microwave signal;

a storage member for storing a plurality of digital samples; and a data stream analyzer for analyzing a data stream that includes said digital samples.

12. The apparatus of claim 11, further comprising:

a second dipole antenna in contact with said slurry, said second dipole antenna being at a position along said flowline upstream from said first dipole antenna for transmitting a second microwave signal into said flowline, said second dipole antenna having two legs with one leg shorter than the other as an unbalanced feed, said at least one microwave energy source being operable to supply a transmitter signal to said second dipole antenna, said at least one detector being operable for detecting a second signal responsive to said second microwave signal.

13. The apparatus of claim 12, wherein said first and second dipole antennae have a selected diameter as a function of matching an impedance of said antennas with said slurry.

14. The apparatus of claim 11, further comprising:

at least one co-axial connectors for supporting said first dipole antenna, said at least one co-axial connector each extending through a tubular wall for containing said slurry.

15. The apparatus of claim 11, wherein said first dipole antenna is curved to match a contour of a tubular wall for containing said slurry.

16. The apparatus of claim 11, wherein said detector is operable for detecting a first reflected signal.

17. The apparatus of claim 11, further comprising:

a dipole antenna marker disposed within at least one of said elements within said slurry.

18. A method for detecting a velocity of an element in a flowstream through a flowline, said method comprising the steps of:

directing said flowstream between an upstream transmitter and an upstream receiver;

directing said flowstream between a downstream transmitter and downstream receiver;

transmitting an upstream microwave signal from said upstream transmitter to said upstream receiver through said flowstream at a first frequency;

transmitting a downstream microwave signal from said downstream transmitter to said downstream receiver through said flow stream at a second frequency;

altering said upstream microwave signal with at least one marker element in said flowstream as said at least one marker element intersects said upstream microwave signal to thereby produce an upstream signal to be received by said upstream receiver, said upstream signal being at a harmonic frequency with respect to said first frequency; and altering said downstream microwave signal with said at least one marker element in said flowstream as said at least one marker element intersects said downstream microwave signal to thereby produce an downstream signal to be received by said downstream receiver, said downstream signal being at a harmonic frequency with respect to said second frequency.

19. The method of claim 18, wherein:

said first frequency is at least approximately equal to said second frequency.

20. The method of claim 18, further comprising:

measuring a transit time between said upstream signal and said downstream signal.

21. The method of claim 20, further comprising:

providing a plurality of said marker elements, and measuring a transit time between a last of said plurality of said marker elements to produce said upstream signal and a first of said plurality of said marker elements to produce said downstream signal.

22. A method for detecting a velocity of an element in a flowstream through a flowline, said flowstream having a flowstream impedance, said method comprising the steps of:

providing an upstream dipole transmitter in contact with said flowstream in said flowline;

providing a downstream dipole transmitter in contact with said flowstream in said flowline;

matching an upstream transmitter antenna impedance of said upstream dipole transmitter antenna at least in part by unbalanced feeding of said first dipole antenna;

matching a downstream antenna transmitter impedance of said downstream dipole antenna to said flowstream impedance at least in part by unbalanced feeding of said downstream dipole transmitter antenna;

transmitting respective upstream and downstream signals into said flowstream with said upstream and downstream dipole transmitters; and detecting said element in said flowstream as a function of a transitory change in said flowstream impedance caused by said element.

23. The method of claim 22, further comprising:

providing a co-axial connector within a tubular wall of said flowline to support said first and second dipole antennas.

24. The method of claim 22, wherein said step of matching a first antenna further comprises:

providing a diameter of a conductor of said first antenna to be less than about two millimeters.

25. The method of claim 22, wherein said step of matching said first antenna further comprises:

providing a tubular insulator for a conductor of said first antenna, said tubular insulator having a wall thickness less than about two millimeters.

26. The method of claim 22, further comprising:

receiving a reflection signal from said upstream dipole transmitter antenna.

27. The method of claim 22, further comprising:

providing an upstream dipole receiver antenna within said flowline at an upstream position in said flowstream.

28. The method of claim 27, further comprising:

providing said upstream dipole receiver antenna with a length approximately one-half a length of said upstream dipole transmitter antenna.

29. The method of claim 28, further comprising:

providing a marking element with a non-linear voltage response for producing an upstream signal having a frequency that is a harmonic of a transmitter frequency.

30. The method of claim 29, wherein said step of providing a marking element comprises providing said marking element with a diode portion.

31. The apparatus of claim 1 in which an upstream detector is not required.

* * * * *